United States Patent [19]

Lewis

[11] Patent Number: 4,531,036

[45] Date of Patent: Jul. 23, 1985

[54] APPARATUS AND METHOD FOR INDUCTIVELY HARDENING SMALL BORES

[75] Inventor: John C. Lewis, Dundas, Canada

[73] Assignee: Park-Ohio Industries, Inc., Shaker Heights, Ohio

[21] Appl. No.: 602,549

[22] Filed: Apr. 20, 1984

[51] Int. Cl.³ .............................................. H05B 6/38
[52] U.S. Cl. ............................. 219/10.43; 219/10.57; 219/10.67; 219/10.79; 266/129; 148/150
[58] Field of Search .............. 219/10.43, 10.41, 10.57, 219/10.67, 10.75, 10.79; 266/129; 148/145, 150, 143

[56] References Cited

U.S. PATENT DOCUMENTS

| 3,209,114 | 9/1965 | McBrien ........................... 219/10.75 |
| 3,338,759 | 8/1967 | Ledl et al. ..................... 219/10.57 X |
| 3,684,852 | 8/1972 | Seyfried .......................... 219/10.57 |
| 3,708,645 | 1/1973 | Osborn ............................ 219/10.41 |
| 3,846,609 | 11/1974 | Enk ................................ 219/10.79 |
| 3,988,559 | 10/1976 | Capolongo ....................... 219/10.43 |
| 4,251,705 | 2/1981 | Badzer ............................. 219/10.59 |
| 4,311,896 | 1/1982 | Junya .............................. 219/10.57 |

Primary Examiner—Philip H. Leung
Attorney, Agent, or Firm—Body, Vickers & Daniels

[57] ABSTRACT

A method and apparatus for hardening a small internal passage in a workpiece wherein the workpiece is indexed into coaxial alignment between axially spaced inductor coils and an actuator telescopically inserts a magnetically permeable flux concentrating rod through the passage, and coextensive with the coils and in inductive relationship with the interior surface, such that upon energization of the coils, flux is concentrated in the concentrating rod and effectively inductively delivered to the surface to raise the temperature thereof to a heat treating temperature, the actuator being extended to another position wherein a quenching ring is disposed adjacent to the surface for delivering coolant thereto to quench harden the surface, the actuator being finally retracted to allow sequential indexing of workpieces.

9 Claims, 6 Drawing Figures

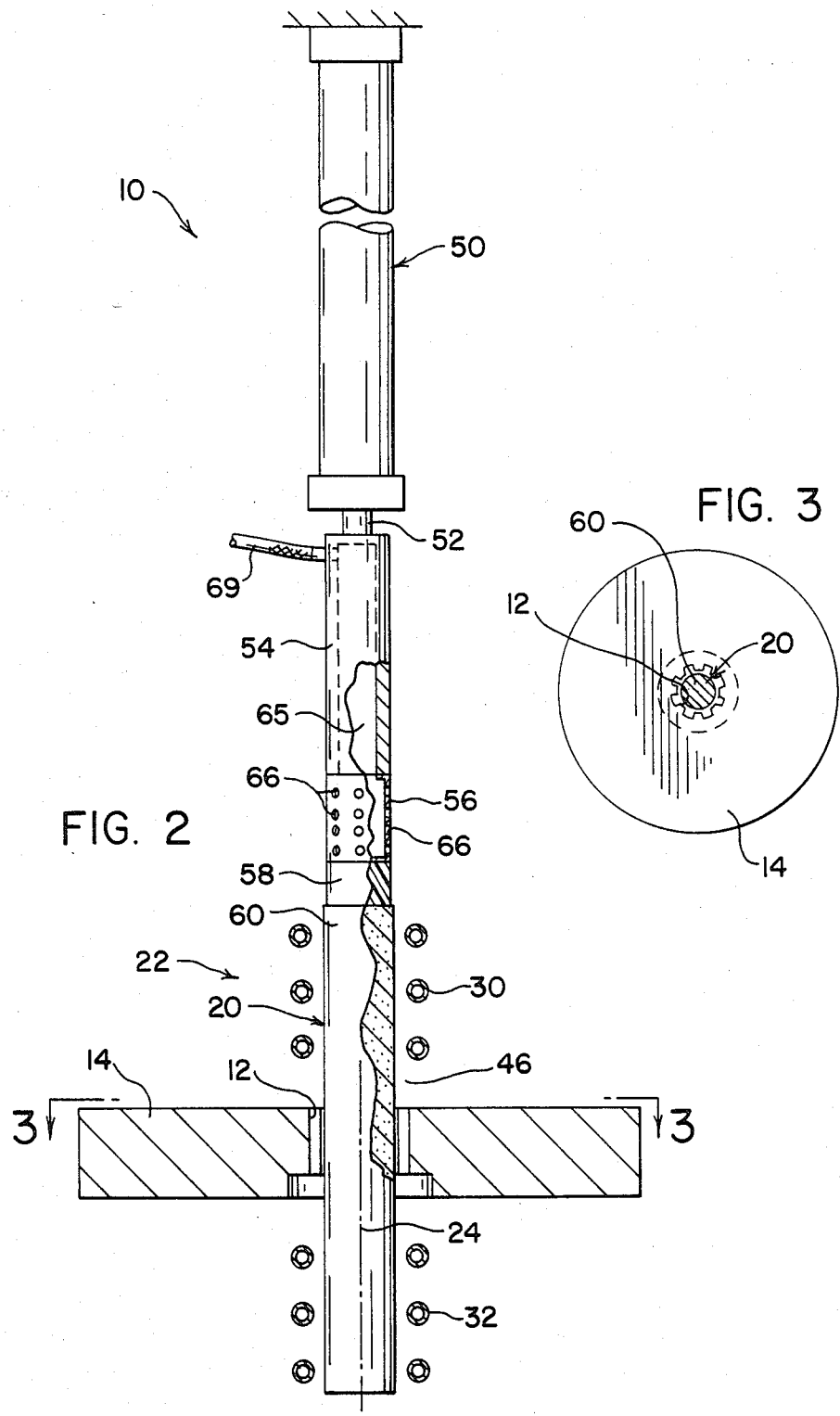

APPARATUS AND METHOD FOR INDUCTIVELY HARDENING SMALL BORES

BACKGROUND OF THE INVENTION

The present invention relates to the art of induction heating and, more particularly, to a method and apparatus for inductively heating and quench hardening small bores of workpieces.

The invention is particularly applicable for inductively heating a small internal splined bore of a workpiece preparatory to quench hardening thereof and it will be described with particular reference thereto; however, the invention has many broader applications and may be useful for inductively heating various small workpiece passages.

In the field of heat treating, inductively heating a cylindrical surface of a workpiece to an elevated temperature and subsequently quenching it, is a well accepted technique for providing locally hardened surfaces. Therein a multi-coiled inductor is energized by a high frequency power supply so as to be magnetically coupled with the adjacent surface of a workpiece. The resultant induced flux inductively heats the surface to the desired depth and heat treating temperature such that the subsequent quenching produces the requisite quench hardening of the surface.

In order for such hardening to be effective, the inductor must be able to transfer the requisite flux to the workpiece surface in order to raise the temperature to the required level. For outer cylindrical surfaces and larger diameter inner cylindrical surfaces, the inductor coil can be sized to effectively transfer the necessary flux energy. In cases of small internal diameters, however, the size of the coil is limited, and for small diameters of an inch or less it has not heretofore been possible to use induction heating to provide localized case hardening of these internal surfaces. In applications such as internally splined hubs and the like, alternative heat treating to inductive case hardening is necessary. These alternatives are more expensive and do not provide the localized hardening which induction heating can provide.

SUMMARY OF THE INVENTION

In accordance with the present invention, small internal cylindrical surfaces of workpieces can be effectively inductively heated and quench hardened by means of a magnetically permeable flux concentrator member which is telescopically inserted through the bore and which is energized by encircling inductor coils disposed on either side of the workpiece in a manner which permits sufficient energy transfer for effective inductively heating small diameter splined bores.

More particularly, a pair of multi-turn cylindrical inductor coils, connected in series or parallel to a high frequency power supply, are disposed along a common axis with a transverse workpiece passage therebetween. The workpiece, having a small diametrical bore which is desired to be surface hardened, is indexed in the passage coaxial with the coils. A highly magnetically permeable flux concentrating rod mounted on the output shaft of the two stage air cylinder is telescopically moved along the coil axis. In a first extended heating position, the rod is longitudinally coextensive with the coils and in close inductive heating proximity with the splined bore. With this arrangement, the coils can be sufficiently sized and energized to transfer and concentrate the flux within the concentrating rod. The resultant magnetic coupling with the workpiece transfers the concentrated flux sufficiently to inductively heat the splines to the predetermined heat treating temperature.

Also carried on the shaft of the cylinder is a quenching ring which is fluidly connected to a coolant supply. In the second extended position of the cylinder, the quenching ring registers with the inductively heated splined surface and a coolant is delivered through radial apertures in the ring to rapidly cool the heated area to produce a case hardening thereof.

Following the quenching operation, the air cylinder fully retracts so as to permit removal of the workpiece through the transverse passage from the heat treating location.

With this arrangement, it is possible to provide for high production quench hardening of workpieces having small diameter bores requiring localized heat treatment.

Accordingly, it is an object of the present invention to provide a method and apparatus for hardening small internal surfaces by inductive heating.

Another object of the present invention is to provide a method for inductively heating and quench hardening small internal cylindrical surfaces by means of a highly permeable flux concentrator which is telescoped into inductively coupled relationship with the surface and is energized by means of axially spaced inductor coils encircling the concentrator and disposed on either side of the workpiece, thereby inductively heating the cylindrical surface, the concentrator being retractable to permit indexing of the workpieces to and from the heating location.

A further object of the present invention is to provide an induction heating apparatus for surface hardening a small diameter bore of a workpiece, wherein the workpiece is located at a heat treating station with multiple turn inductor coils spaced along the axis of the bore on either side of the workpiece, and a flux concentrator and quenching assembly mounted on an extendable arm of a two stage air cylinder is sequentially indexed to a first position wherein the flux concentrator is telescopically inserted within the bore axially coextensive with the coils such that flux from the coil energization is concentrated in the concentrator and the resultant inductive coupling with the workpiece transfers the energy to the area of the bore sufficient to raise the temperature thereof to a predetermined heat treating temperature, and at a second position a quenching ring delivers coolant to the heated surface to quench harden the same, the concentrator and the quenching ring being retracted from the workpiece to allow indexing of parts.

These and other objects of the present invention will be apparent to those skilled in the art from the accompanying detailed description taken in conjunction with the following drawings.

DESCRIPTION OF THE DRAWINGS

FIG. 2 is an enlarged partially sectioned view of the flux concentrator and quenching assembly with the flux concentrator rod in the heating position;

FIG. 3 is a view taken along line 3—3 in FIG. 2;

DETAILED DESCRIPTION OF A PREFERRED EMBODIMENT

Figure 1:
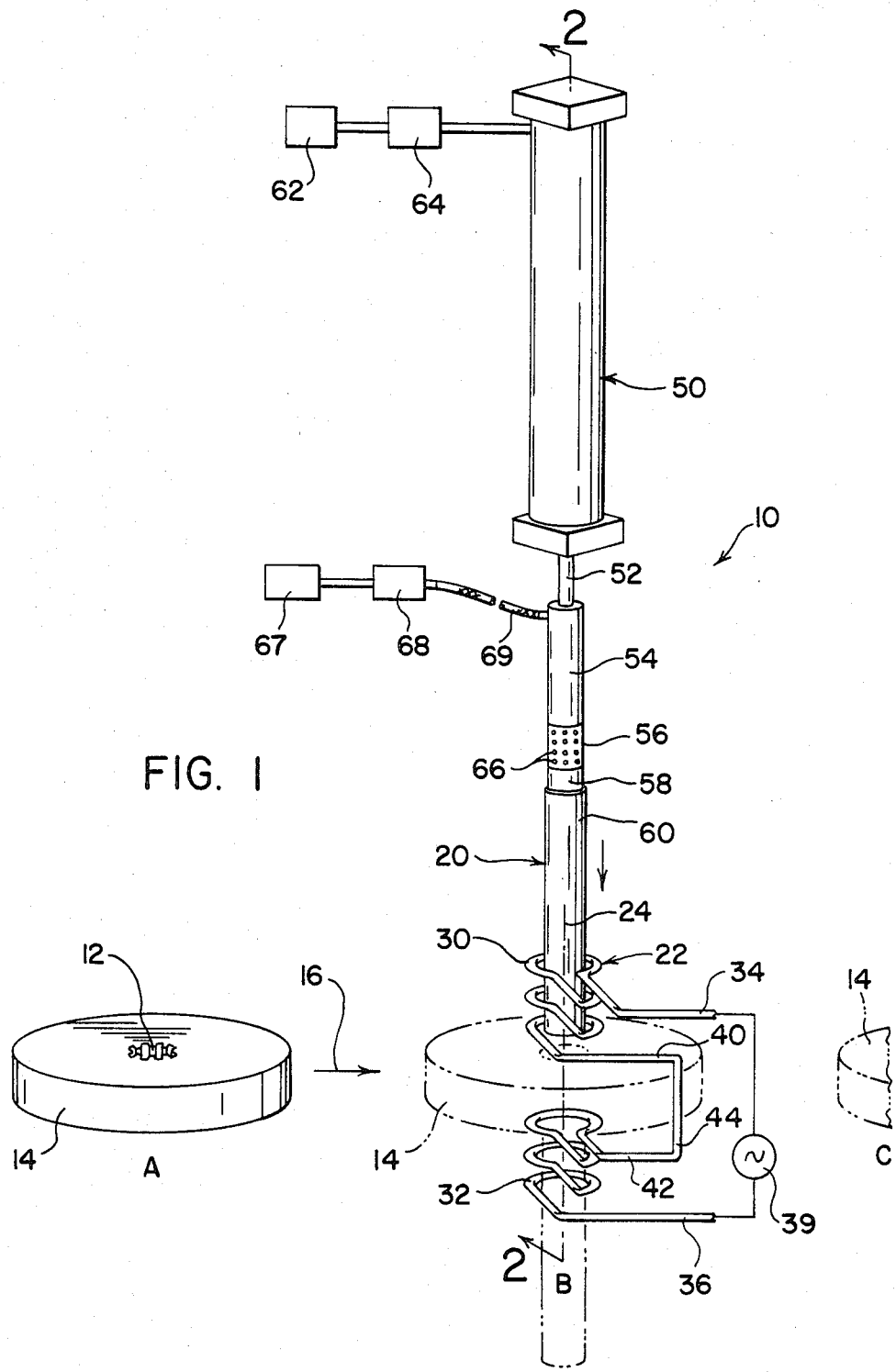
FIG. 1 is a perspective view showing, partially schematically, a preferred embodiment of the present invention.

Referring to the drawings showing a preferred embodiment for purposes of illustrating but not limiting the present invention, FIG. 1 shows an induction heating apparatus 10 for inductively heating and quench hardening small diameter internal splined bores 12 of generally cylindrical workpieces 14 traveling horizontally between indexed positions on a workpiece path 16.

The path 16 may be part of any readily commercially available transfer device which serves to sequentially transfer the parts in timed controlled relation from a loading station A to a heat treating station B and onto an unloading station C. Inasmuch as this function, from an equipment and control standpoint, may be provided in many forms, any suitable device for fulfilling the above transfer needs will be satisfactory.

The apparatus 10 generally comprises a quenching and concentrating assembly 20 and an inductor assembly 22, both of which are coaxially disposed with respect to a working axis 24 which is coaxial with the bore 12 of the workpiece 14 at the heat treating station B. The coil assembly 22 comprises a pair of axially spaced multiple-turn inductor coils 30 and 32 generally helically wound on the same frame. The inductor coils 30 and 32 have outer leads 34 and 36 electrically connected to a conventional high frequency alternating current power supply 39, and having inner leads 40 and 42 commonly connected by bridge member 44 so as to electrically place the coils 30 and 32 in series. Alternatively, the coils 30 and 32 may be electrically connected in parallel.

The inductor coils 30 and 32 are axially spaced along the working axis 24 and defined therebetween a transverse workpassage 46 which receives the workpiece 14 in its progress from station A to station C. The coils 30 and 32 have an inner diameter slightly larger than the quenching and concentrating assembly 22.

As is conventional, the inductor coils are hollow in construction and are supplied with coolant to maintain the operating temperature of the inductor coils within predetermined operating temperatures. The inner diameter of the coils 30 and 32 and the inner diameter of the splined bore 12 are sized with respect to the outer diameter of flux concentrating rod of the assembly 20 to establish the requisite inductive couplings therebetween.

The quenching and concentrating assembly 20 is mounted on a frame assembly, not shown, vertically above the path 16 and the coil assembly 22. Alternatively, the assembly may be mounted below the coil assembly 22 or at any appropriate position with reference to the disposition of the work path 16.

The assembly 20 comprises a two stage air cylinder assembly 50 having a downwardly projecting output shaft 52. Extending axially downwardly from the shaft 52 is a coolant delivery tube 54, a quenching ring 56, a spacer member 58 and a flux concentrating rod 60, all of which are coaxially disposed for reciprocable movement along the axis 24 between the retracted position shown in solid lines and the extended position shown in broken lines.

Figure 4:
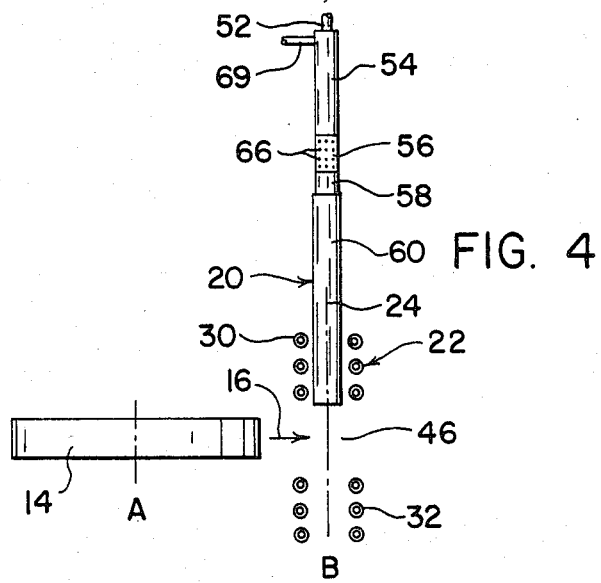
FIG. 4 is an enlarged cross-sectional view showing the assembly in the indexing position.
Figure 5:
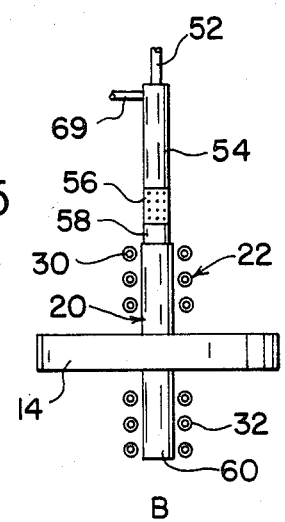
FIG. 5 is a cross-sectional view similar to FIG. 4 showing the assembly in the heating position; and, FIG. 6 is a view similar to FIG. 4 showing the assembly in the quenching position.
Figure 6:
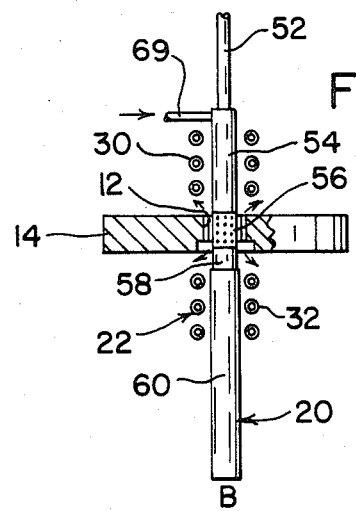

The air cylinder 50 is of a conventional two stage pneumatic, hydraulic or like design and is operated from a fluid supply 62 by means of a control unit 64. The control unit 64 is itself conventional in the art and serves to reciprocate the shaft 52 in scheduled telescopic movement along the axis 24 between the illustrated retracted indexing position which permits free passage, in co-jointly timed sequence, of the workpiece 14 between stations A, B and C as shown in FIG. 4. As shown in FIG. 5, in a first extended position the flux concentrating rod 60 is axially coextensive with the coil assembly 22 and extends through the bore 12 of the workpiece 14 in an inductive heating position. As shown in FIG. 6, in a second extended position, the quenching ring 58 is axially aligned with the bore surface in a quenching position.

Referring to FIG. 2, the coolant delivery tube 54 comprises an elongated tubular member fixedly connected at its upper end to the shaft 52. The tube 54 has an internal passageway 65 fluidly communicating with the quenching ring 56.

The quenching ring 56 is cylindrically and fixedly attached to the lower end of the tube 54. The quenching ring 56 includes a plurality of radial apertures 66 for distributing coolant to the bore surface. As shown in FIG. 1, the coolant is delivered from a coolant supply 67 under the control of valve 68 to a flexible supply line 69 fluidly connected to the delivery tube 54 at a branched inlet 69. The coolant flows through the passageway 65 into the ring 56 and radially outwardly through the apertures 66 onto the inductively heated bore surface to quench harden the surface thereof. The valve 68 may be of any suitable commercially available design which will deliver coolant from the coolant supply 67 to the quenching ring 56 when the latter is disposed in the quenching position and at a rate providing the necessary quenching of the inductively heated surface.

The spacer 58 is generally cylindrical and is fixedly connected at its lower end to the upper portion of the concentrating rod 60 and at its upper end to the quenching ring 56. The spacer 58 is formed of an electrically non-conductive material and serves to electrically insulate the concentrating rod 60 from the quenching ring 56 and the air cylinder 50.

The flux concentrating rod 60 is formed of a suitable magnetically permeable material such as laminated iron or ferrox cube iron powder. The material is selected so as to receive the induced flux of the coils without appreciable heating and to effectively inductively transfer the energy to the bore surface as hereinafter described. The concentrating rod 60 is longitudinally coextensive with the coil assembly 22 having a length substantially the same or greater than the overall length of the coil assembly 22 so as to effectively receive full energization of and concentrate within the energy delivered by the coils 30 and 32. The concentrating rod 60 has an outer diameter which is radially spaced from the inner surface of the bore 12 so as to establish an effective inductive air gap therebetween in accordance with conventional practice.

In operation, with the air cylinder 50 in the retracted indexing position shown in FIG. 4 and the concentrating rod 60 withdrawn from the passage 46, a workpiece 14 is indexed along the conveyor path 16, from station A to station B to locate the bore 12 coaxial with the working axis 24. The workpiece 14 is thus effectively in electrically shorted relationship with the coils 30 and 32.

The control unit 64 is energized to deliver fluid from the source 62 to the cylinder 50 so as to extend the shaft 52 to the first extended position. This locates the concentrating rod 60 in the inductive heating position shown in FIG. 5. The power supply 38 is then energized. The flux generated by the coils 30 and 32 is concentrated in the rod 60. With the part in shorted relationship between the inductors, the concentrated flux is consequently delivered to the workpiece 14 to raise the splined bore area by inductive heating to a predetermined heat treating temperature.

When the workpiece 14 has reached the predetermined heat treating temperature, the power supply 38 is de-energized and the control unit 64 energized to extend the shaft 52 to the second extended position wherein the quenching ring 56 is circumferentially aligned with the splined surface. Thereafter, the control unit 68 is energized to deliver coolant from the supply 67 through the line 69 to tube 54 for distribution via the quenching ring 56 onto the surface 12 so as to rapidly cool the surface from the heat treating temperature sufficient to provide the desired quench hardened properties therefor.

Following the quenching operation, the control unit 64 is energized to fully retract the shaft 52. The workpiece 14 is then indexed to station C with the following workpiece being transferred into alignment at the work station B. With the above arrangement, small parts having diameters of 1 inch or less can have their inner cylindrical surface areas effectively raised to inductive heat treating temperatures. The apparatus and method lends itself to automated production with low energy requirements.

It will be appreciated that the above advantages in apparatus and operation can be provided by alternative arrangements of parts and components so as to provide flux concentrating from externally disposed coils for delivery onto the internal surface, and to thereafter, in timed sequence provide the quenching operation. It will also be appreciated that the flux concentrator member can take various cross-sectional profiles so as to perform the desired heat treating on irregularly shaped internal surface as well as in the areas radially outward therefrom.

The invention has been above described with reference to the preferred embodiment. Obviously, modifications and alterations will occur to those skilled in the art upon reading of this detailed description. It is my intention to include all such modifications and alterations insofar as they come within the scope of the appended claims or equivalence thereof.

Having thus described my invention, it is claimed:

1. An apparatus for inductively heating a small internal passage in a workpiece, comprising: a cylindrical inductor coil assembly having multiple-turn inductor coil sections, said inductor coil sections having an inner diameter larger than said passage and spaced along an axis with the axial space therebetween defining a transverse workpiece passage for receiving the workpiece in coaxial alignment therewith at an indexed position, said inductor coil assembly adapted to be energized by electrical power supply means; actuator means mounted in fixed relationship with the inductor coil assembly and having an output member telescopically movable along said axis of said coil assembly between a heating position and a transfer position; a magnetically permeable cylindrical flux concentrator member carried by the output member and coaxially aligned with said axis of said coil assembly, said concentrator member having a diameter smaller than said passage and an axial length coextensive with the coil assembly in said heating position with the workpiece at said indexed position and spaced from the passage in said transfer position to permit insertion and removal of workpieces, whereby upon energization of the power supply means the coil assembly is magnetically coupled to the flux concentrator member and the latter inductively heats the surface of the passage in the workpiece to a predetermined heat treating temperature.

2. The apparatus as recited in claim 1, wherein a quenching ring adapted to be fluidly connected to a coolant supply is carried by the output member, said quenching ring being telescopically received in the passage in a further position of the output member along said axis for delivering coolant to the passage to quench harden the surface thereof from said predetermined heat treating temperature.

3. The apparatus as recited in claim 2, wherein the quenching ring is operatively and fluidly connected to a hollow tubular member carried by said output member, which tubular member is fluidly adapted to be connected to said coolant supply.

4. The apparatus as recited to claim 1, wherein the coil sections are electrically interconnected such that the workpiece is in electrically shorted relationship therewith and the inductive heating is concentrated at the surface area.

5. The apparatus as recited in claim 4, wherein the coil sections are electrically interconnected in series.

6. The apparatus as recited in claim 5, wherein the coil sections are electrically connected in parallel.

7. The apparatus as recited in claim 1, wherein the flux concentrator is electrically insulated from the output member by a non-conductive spacer member.

8. A method for inductively heating a small internal cylindrical surface of a workpiece traveling along a work path comprising the steps of:
  (a) locating the workpiece in the work path between a pair of multi-turn inductor coils spaced along an axis with the internal cylindrical surface of the workpiece coaxial therewith;
  (b) after said locating, telescopically inserting a cylindrical flux concentrating member along said axis through the inductor coils and the cylindrical surface of the workpiece coaxially and substantially longitudinally coextensive therewith to establish inductively coupled relationships between said coils and said concentrator member and between said concentrator member and the inner cylindrical surface of the workpiece; and
  (c) energizing the coils thereby magnetically coupling the flux concentrator member to said coils and inductively locally heating the inner cylindrical surface to a predetermined heat treating temperature.

9. The method as recited in claim 8, wherein quenching means coaxially carried with the concentrator member are located adjacent the surface following step (c) and delivers coolant onto the surface to controlledly lower the temperature of the surface and provide quench hardening thereof.

* * * * *